United States Patent
Segev et al.

(10) Patent No.: US 12,526,771 B2
(45) Date of Patent: Jan. 13, 2026

(54) OFDMA TRIGGER BASED PEER TO PEER OPERATIONS WITH DUAL-STAGE TRIGGERING

(71) Applicant: Intel Corporation, Santa Clara, CA (US)

(72) Inventors: Jonathan Segev, Sunnyvale, CA (US); Qinghua Li, San Ramon, CA (US); Xiaogang Chen, Portland, OR (US); Ofer Hareuveni, Haifa (IL); David Birnbaum, Modiin (IL)

(73) Assignee: Intel Corporation, Santa Clara, CA (US)

( * ) Notice: Subject to any disclaimer, the term of this patent is extended or adjusted under 35 U.S.C. 154(b) by 439 days.

(21) Appl. No.: 17/555,115

(22) Filed: Dec. 17, 2021

(65) Prior Publication Data
US 2022/0182981 A1 Jun. 9, 2022

(51) Int. Cl.
*H04W 72/02* (2009.01)
*H04L 5/00* (2006.01)
(Continued)

(52) U.S. Cl.
CPC ........... *H04W 72/02* (2013.01); *H04L 25/023* (2013.01); *H04W 72/0446* (2013.01); *H04L 5/0007* (2013.01)

(58) Field of Classification Search
CPC ............. H04W 72/02; H04W 72/0446; H04W 72/23; H04W 84/12; H04W 92/18;
(Continued)

(56) References Cited

U.S. PATENT DOCUMENTS

2012/0224484 A1* 9/2012 Babiarz ............... H04L 41/5019
370/235
2019/0342917 A1* 11/2019 Liu .................... H04W 74/0808
(Continued)

FOREIGN PATENT DOCUMENTS

CN 116266784 A 6/2023

OTHER PUBLICATIONS

Peer to Peer Systems (Year: 2022).*
(Continued)

*Primary Examiner* — Kodzovi Acolatse
*Assistant Examiner* — Anindita Sen
(74) *Attorney, Agent, or Firm* — Schwegman Lundberg & Woessner, P.A.

(57) ABSTRACT

A station (STA) may operate as a first peer-to-peer (P2P) client (P2P1) for P2P operations with dual-stage triggering. The STA may decode a primary frame trigger frame (TF) from an access point (AP) operating as a coordinator. The primary TF may allocate resources in an initial portion of a time-duration allocation to the P2P1 for the P2P operations with one or more other peer stations, including a second P2P client (P2P2) and a third P2P client (P2P3). The primary TF may further allocate resources in a subsequent portion of the time-duration allocation to the P2P2 for the P2P operations. The STA may also encode a first secondary TF for transmission within the initial portion of the time-duration allocation. The first secondary TF may allocate specific resource units (RUs) to the one or more other peer stations. The STA may also decode a TB physical layer protocol data unit (TB PPDU) encoded in accordance with a multi-user orthogonal frequency division multiple access (MU OFDMA) frame format. The TB PPDU may be received concurrently within the initial portion of the time-duration allocation from the one or more other peer stations in accordance with an uplink OFDMA technique.

20 Claims, 8 Drawing Sheets

(51) Int. Cl.
*H04L 25/02* (2006.01)
*H04W 72/0446* (2023.01)

(58) Field of Classification Search
CPC ............. H04W 72/0453; H04L 25/023; H04L 5/0007; H04L 25/0224; H04L 67/104
See application file for complete search history.

(56) References Cited

U.S. PATENT DOCUMENTS

| | | | |
|---|---|---|---|
| 2021/0235497 A1* | 7/2021 | Noh | H04W 74/0816 |
| 2022/0264566 A1* | 8/2022 | Chu | H04W 72/0446 |
| 2023/0021113 A1* | 1/2023 | Shafin | H04W 52/0216 |
| 2023/0104446 A1* | 4/2023 | Ajami | H04W 84/12 |
| | | | 370/329 |
| 2023/0276506 A1* | 8/2023 | Huang | H04W 74/0833 |
| | | | 370/329 |
| 2023/0354418 A1* | 11/2023 | Kim | H04W 74/006 |
| 2023/0354424 A1* | 11/2023 | Nezou | H04W 74/0816 |
| 2023/0413327 A1* | 12/2023 | Kim | H04W 74/0816 |
| 2024/0422824 A1* | 12/2024 | Kim | H04W 72/0457 |

OTHER PUBLICATIONS

Enhancing P2P Systems over Wireless Mesh Networks (Year: 2022).*

"U.S. Appl. No. 17/555,115, Preliminary Amendment mailed Apr. 19, 2023", 15 pgs.

* cited by examiner

OFDMA TRIGGER BASED PEER TO PEER OPERATIONS WITH DUAL-STAGE TRIGGERING

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications. Some embodiments relate to peer-to-peer (P2P) operations such as Wi-Fi Aware networking and 802.11 Tunneled Directed Link Setup

BACKGROUND

In 2019 the FCC enabled use of certain channels in the 6 GHz band. This resulted in the Wi-Fi 6e program which requires fixed indoor Access Point (AP) operation in Low Power (LP) and under the use of channel master which continuously communicate with a network entity to verify co-existence with incumbents use of the channels. This Low Power indoor operation is limited to AP to client station (STA) operation and is not useable for Peer to Peer (P2P) devices. Thus, what is needed are improved techniques for P2P operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to OFDMA Trigger-Based (TB) Peer to Peer (P2P) operations with dual-stage triggering. In these dual stage triggering embodiments, the primary TF allocates resources in an initial portion of time-duration allocation to a first station (e.g., P2P1) and allocates resources in a subsequent portion of the time-duration allocation to a second station (e.g., P2P2). A first secondary TF is used by the first station to allocate RUs within the initial portion of time-duration allocation to peer stations for P2P operations (e.g., data transfer) and a second secondary TF is used by the second station to allocate RUs within the subsequent portion of time-duration allocation to peer stations for P2P operations (e.g., data transfer). These embodiments are described in more detail below.

Some embodiments are directed to a station (STA) configured for dual-stage triggering. In these embodiments, when the STA is configured as a first peer-to-peer (P2P) client (P2P1) for P2P operations with dual-stage triggering, the STA may decode a primary trigger frame (TF) from an access point (AP) operating as a coordinator. The primary TF may allocate resources in an initial portion of a time-duration allocation (i.e., a TXOP) to the P2P1 for the P2P operations with one or more other peer stations, including a second P2P client (P2P2) and a third P2P client (P2P3) (e.g., an AP OBSS). The primary TF may further allocate resources in a subsequent portion of the time-duration allocation to the P2P2 for the P2P operations.

Figure 9:
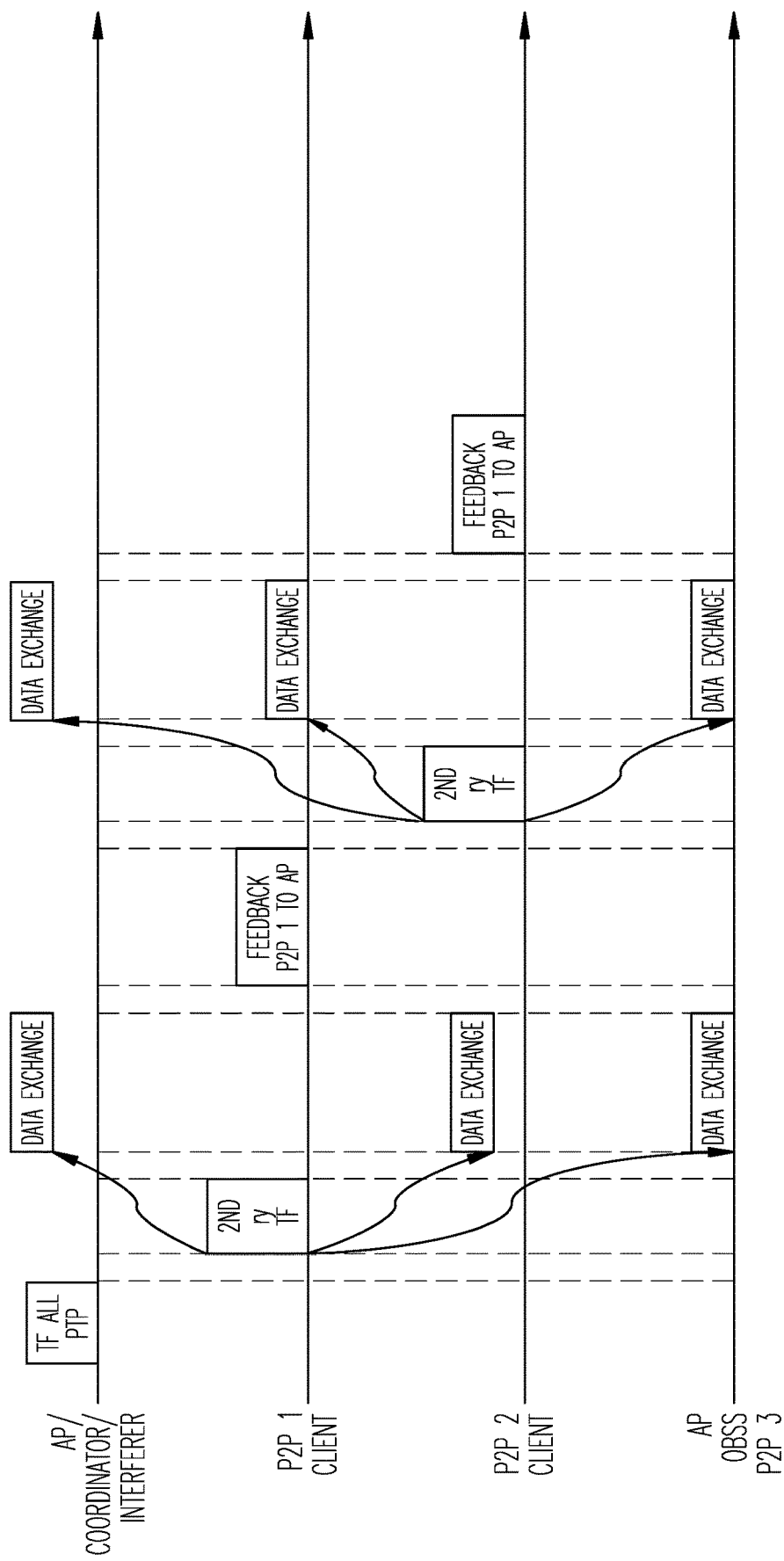
FIG. 9 illustrates an advanced TB P2P operation with multi-secondary allocation from a single main trigger frame (TF), in accordance with some embodiments.

In these embodiments, the STA may also encode a first secondary TF for transmission within the initial portion of the time-duration allocation. The first secondary TF may allocate specific resource units (RUs) to the one or more other peer stations (i.e., P2P2, AP and/or P2P3). The STA may also decode a TB physical layer protocol data unit (TB PPDU) encoded in accordance with a multi-user orthogonal frequency division multiple access (MU OFDMA) frame format. The TB PPDU may be received concurrently within the initial portion of the time-duration allocation from the one or more other peer stations in accordance with an uplink OFDMA technique. In these embodiments, the first secondary TF may be a legacy format trigger frame with LTF training symbols. An example of these P2P operations with dual-stage triggering is illustrated in FIG. 9, which is described in more detail below.

In some embodiments, the first secondary TF may be configured for use by the one or more other peer stations to perform a channel estimate per stream and to use the channel estimate for the transmission of the TB PPDU in accordance with the UL OFDMA technique (i.e., non-overlapping RUs). These embodiments are described in more detail below.

In some embodiments, the STA may decode a second secondary TF received within the subsequent portion of the time-duration allocation. The second secondary TF may allocate resource units (RUs) to the P2P1 and to another of the peer stations (i.e., the AP and/or P2P3). The second secondary TF may include an legacy (LTF) channel-sounding symbols. The STA may perform a channel estimate using the channel-sounding symbols of the second secondary TF. In these embodiments, the STA may also encode a secondary TB PPDU encoded in accordance with a MU OFDMA frame format for transmission to the P2P2. The TB PPDU may be transmitted concurrently within the subsequent portion of the time-duration allocation with a secondary TB PPDU transmitted by the another of the peer stations in accordance with UL OFDMA technique as part of a subsequent P2P data exchange. These embodiments are also described in more detail below.

In some embodiments, for operating in a 6 GHz band, the primary trigger frame may be an enabling signal (i.e., to allow the P2P1 or the P2P2 to transmit in the 6 GHz band). In some embodiments, the P2P operations may be performed in the 2.4 and/or 5 GHz bands.

In some embodiments, the TB PPDUs transmitted to the P2P1 by the AP and at least the P2P2 during the initial portion of the time duration allocation may comprise an initial P2P data exchange. In these embodiments, the secondary TB PPDUs transmitted to the P2P2 by the AP and at least the P2P1 during the subsequent portion of the time duration allocation may comprise a subsequent P2P data exchange.

In some embodiments, the STA may encode a first feedback frame for transmission within the initial portion of the time-duration allocation after the initial P2P data exchange. In some embodiments, the STA may decode a second feedback frame transmitted by the P2P2 within the subsequent portion of the time-duration allocation after the subsequent P2P data exchange.

In some embodiments, the first secondary TF allocates non-overlapping RUs to the one or more other peer stations for transmission of the TB PPDUs in accordance with the UL OFDMA technique within the initial portion of the time-duration allocation. In these embodiments, the second secondary TF may allocate non-overlapping RUs to the P2P1 and to the another of the peer stations for transmission of the secondary TB PPDUs in accordance with the UL OFDMA technique within the subsequent portion of the time-duration allocation. In these embodiments, the UL OFDMA may be applied to overlapping RU allocations.

In some embodiments, the STA may use the second secondary TF to synchronize timing and frequency and to determine transmit power for transmission of the secondary TB PPDU in accordance with the UL OFDMA technique.

Some embodiments are directed to a non-transitory computer-readable storage medium that stores instructions for execution by processing circuitry of a station (STA) configurable for dual-stage triggering. The processing circuitry may configure the STA as a first peer-to-peer (P2P) client (P2P1) for P2P operations with dual-stage triggering. These embodiments are described in more detail below.

Some embodiments are directed to an access point (AP) configured for dual-stage triggering comprising. In these embodiments, for peer-to-peer (P2P) operations with dual-stage triggering operating as a coordinator, AP may encode a primary trigger frame (TF) for transmission that allocates resources in an initial portion of a time-duration allocation (i.e., a TXOP) to a first peer client (P2P1) for the P2P operations with one or more other peer stations. The primary TF may further allocate resources in a subsequent portion of the time-duration allocation to the P2P2 for the P2P operations. The AP may decode a first secondary TF transmitted by the P2P1 within the initial portion of the time-duration allocation. The first secondary TF may allocate specific resource units (RUs) to the one or more other peer stations. The AP may determine a channel estimate using the first secondary TF and may encode a TB PPDU encoded in accordance with a MU OFDMA frame format. The TB PPDU may be transmitted concurrently within the initial portion of the time-duration allocation from the one or more other peer stations in accordance with an uplink OFDMA technique using the channel estimate. These embodiments are further described in more detail below.

Figure 1:
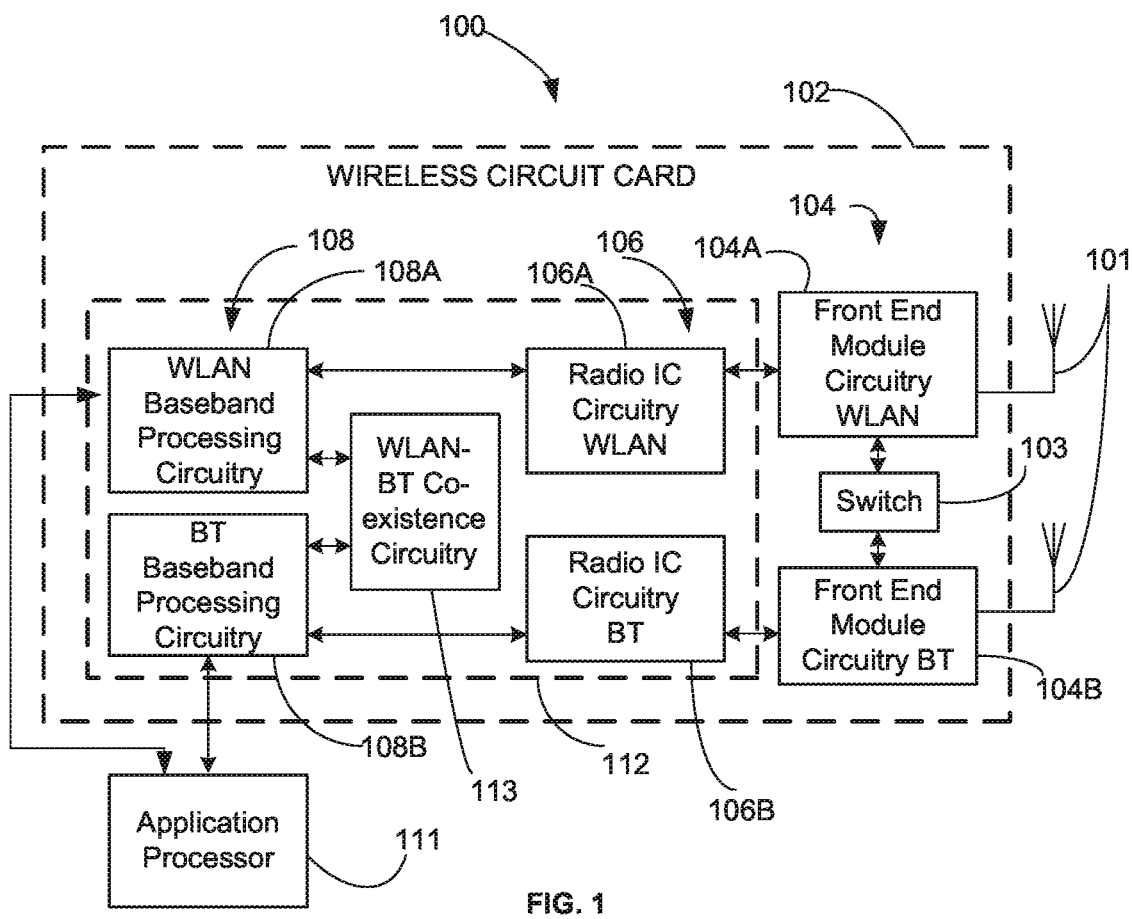
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit signal path and/or a receive signal path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN processing baseband circuitry 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN processing baseband circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-tip-everything (NGV) communications in accordance with the IEEE 802.11bd standard and one or more stations including the AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include BT functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
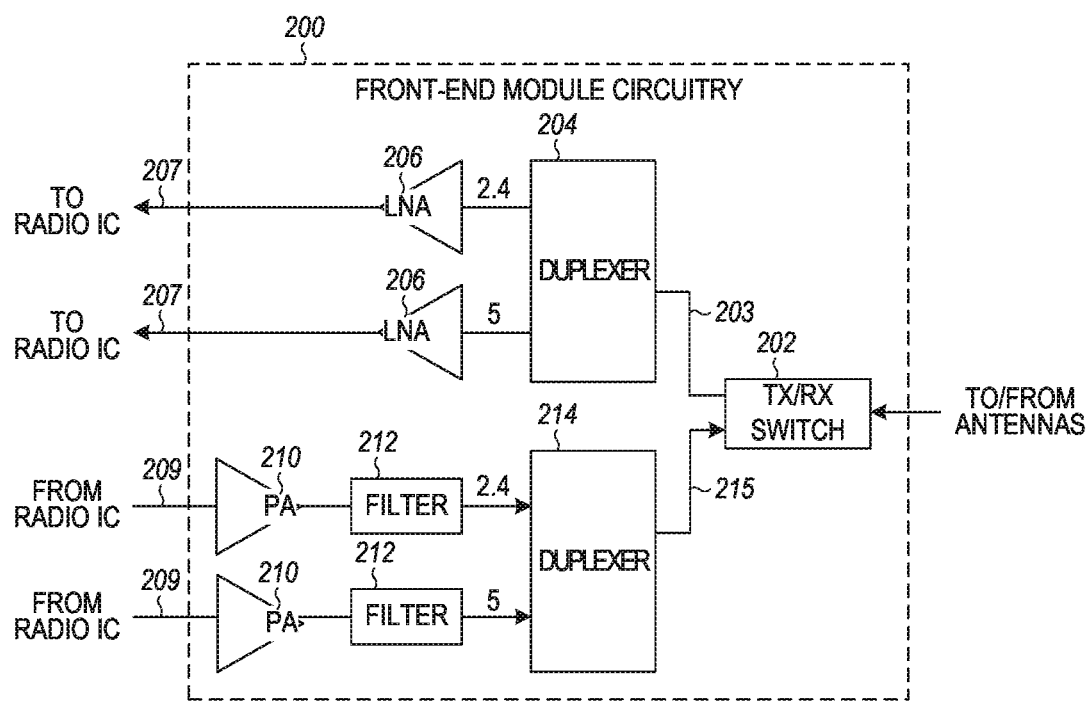
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
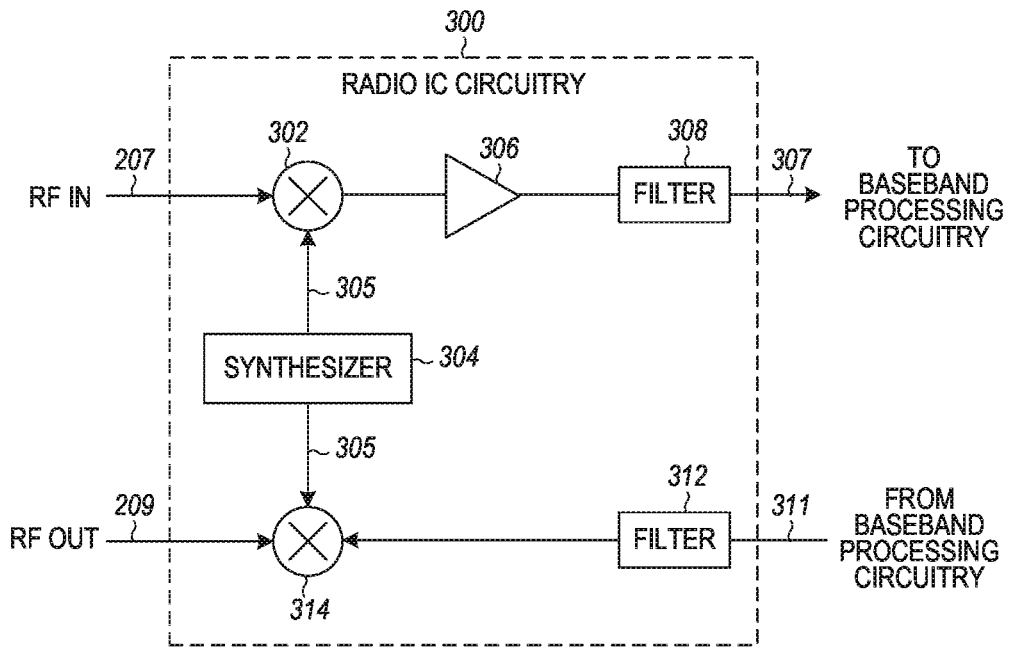
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
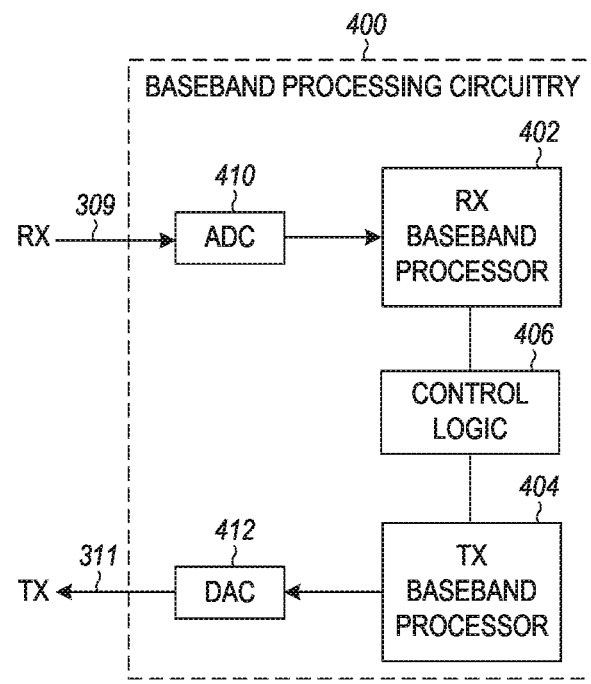
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
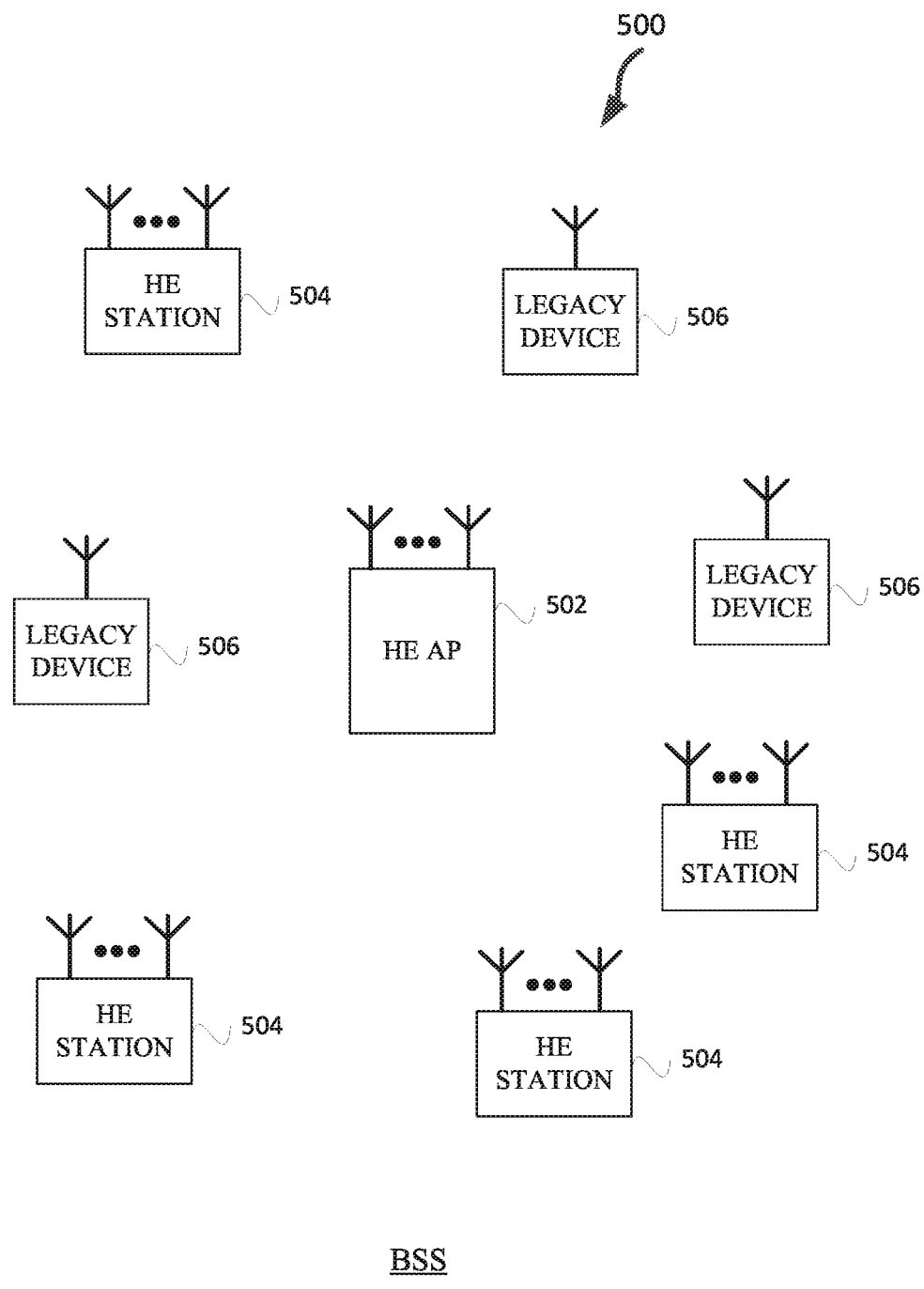
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506. In some embodiments, WLAN 500 may be configured for Extremely High Throughput (EHT) communications in accordance with the IEEE 802.11be standard and one or more stations including the AP 502 may be EHT STAs. In some embodiments, WLAN 500 may be configured for next generation vehicle-to-everything (NGV) communications in accordance with the IEEE 802.11bd standard and one or more stations including the AP 502 may be next generation vehicle-to-everything (NGV) stations (STAs).

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the HE station 504 and/or the HE AP 502 are configured to perform the methods and operations/functions described herein. In example embodiments, an apparatus of the HE station 504 and/or an apparatus of the HE AP 502 are configured to perform the methods and functions described herein. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 6:
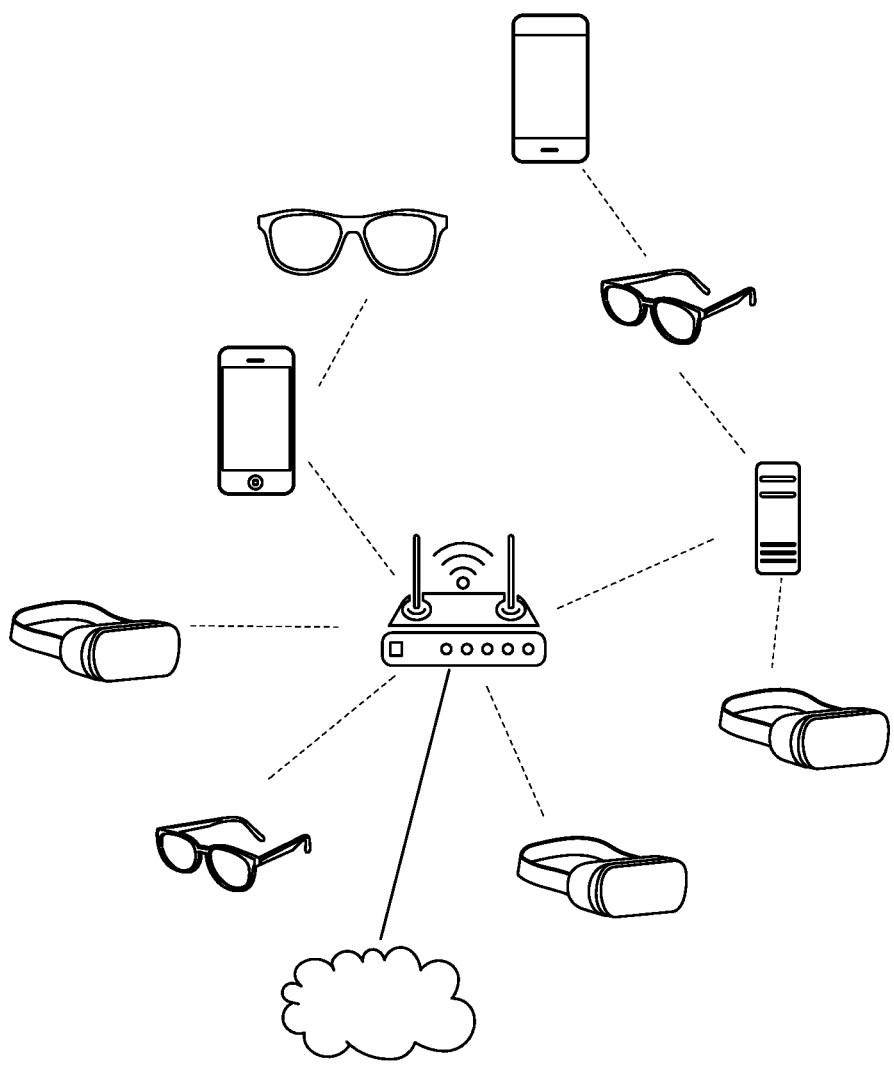
FIG. 6 illustrates a Mixed P2P and Star Configuration in an AR/VR scenario.

FIG. 6 shows an AP to client star topology accompanied with several P2P connections. Note the different P2P connections are independent and unaware of each other's scheduling as well as the AP scheduling. In the 6 GHz band the P2P stations (STA) must operate in the same channel as the AP. The existing technique available in the market is TDLS (Tunneled Direct Link Setup) and it is an unmanaged by the AP once link is setup.

Figure 7:
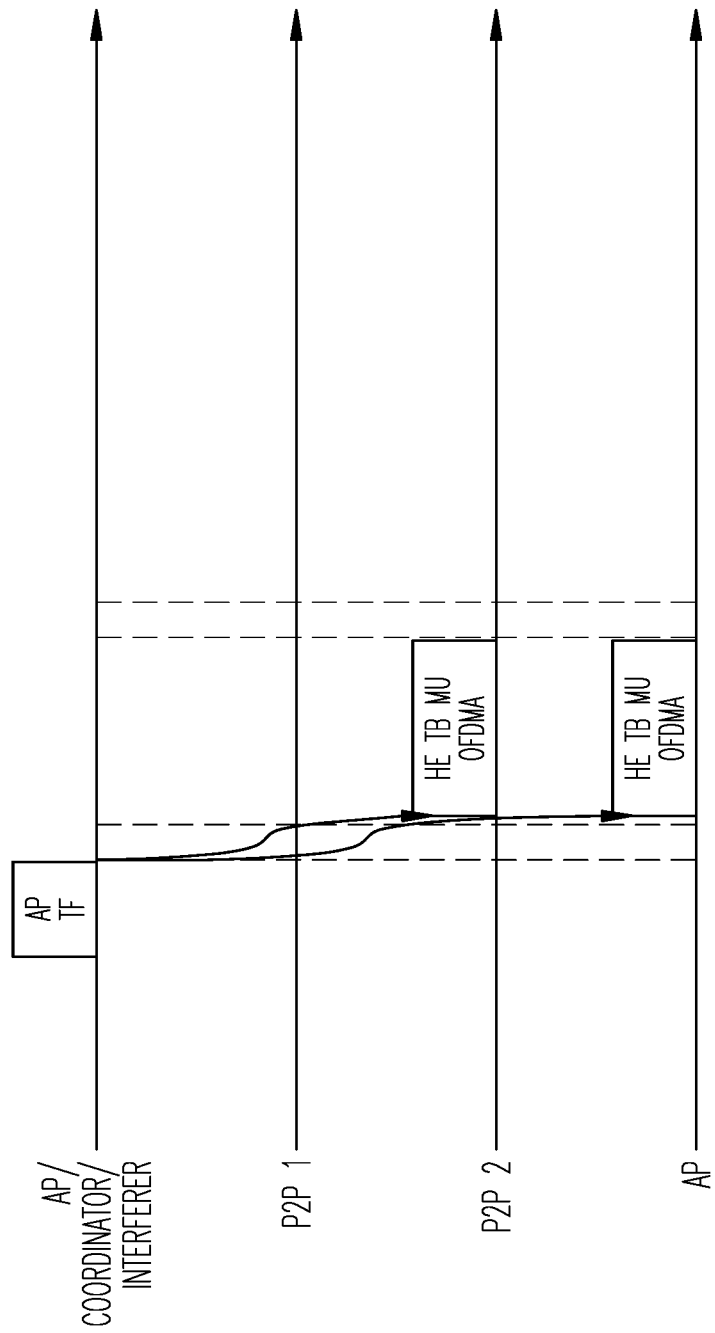
FIG. 7 illustrates a trigger-based (TB) peer-to-peer (P2P) operation in IEEE P802.11be.

In standardization IEEE 802.111.be EHT has a P2P TB operation (see FIG. 7), however this operation is limited to single P2P pair with no ability to manage between more than a single pair, no OFDMA and limited ability of the client STAs to control the scheduling transmitted by the AP. In the 802.11be TB P2P (see FIG. 7) the AP allocates TxOP to the peers for data communication. However this scheme is limited to STA following an assignment by AP but the information regarding scheduling resides with the P2P STAs and not with the AP, and there is a limitation to how fresh the scheduling can be because of the feedback cycle duration.

Use of Tunneled Direct Link Setup (TDLS) as defined in 802.11z is another option, however in this method if more then a single pair of P2P STAs are engaged in data transfer there is no control of QoS across the pair as one pair is unaware to the other. Furthermore there is no OFDMA operation enabled in this case. This causes substantial degradation of the main data service over the channel when TDLS is in use. Furthermore, it is not possible to manage QoS for more than a single P2P pair.

Figure 8:
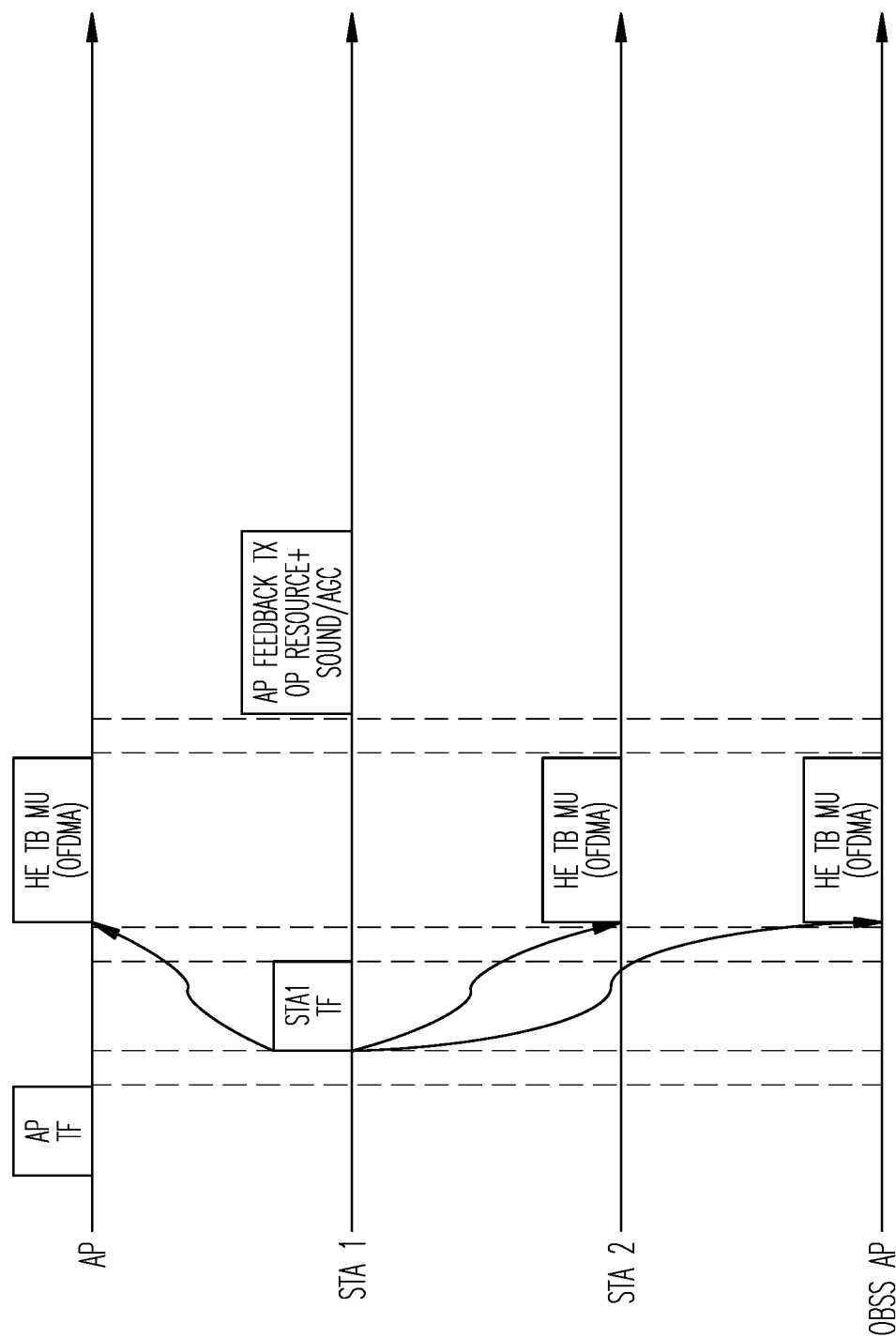
FIG. 8 illustrates an advanced TB P2P operation in accordance with some embodiments.

FIG. 8 illustrates an advanced TB P2P operation in accordance with some embodiments. Embodiments disclosed herein provide a dual-stage Trigger operation. In the first stage, the AP allocates medium duration (e.g., using a control frame) to specific STAs for P2P operation. In the 2nd stage, the STA that was allocated control over the medium transmit a Trigger Frame based on the time duration allocation it received and specific RUs are allocated to its Peer STAs based on the QoS scheduling that may be required in immediate higher time resolution.

Furthermore, in some embodiments, a feedback stage is provided as part of the sequence such that the Triggering STA (STA 1 in FIG. 8) is capable of understanding the status of the transmit source buffer of its peers and is thus is capable of indicating that to the AP which makes the medium reservation.

Advantages

In this scheme the most recent scheduling information resides with the STA transmitting the TF, and as such it is much more flexible to changing real time scheduling needs.

Because the AP only allocates TXOPs (or time intervals) It prevents the AP from overwhelmed with scheduling requirements management of multiple P2P and individual requirements of each connection within the P2P pairs.

The scheme allows for OFDMA operation which is better suited for QoS and data reliability than an SU transmission.

Because the AP may allocate different times to different P2P pairs the scheme has huge advantage over TDLS schemes where P2P Pairs scheduling may conflict with one another.

No frame exchange sequence and no frame format are defined for 802.11be for TB P2P operation that allows use of OFDMA. Embodiments disclosed herein may enable P2P TB OFDMA operation which allows more than a single pair of P2P STAs to co-exist.

FIG. 9 illustrates an advanced TB P2P operation with multi-secondary allocation from a single main trigger frame (TF), in accordance with some embodiments. In these embodiments, medium resources may be allocated to more than single pair of P2P STAs as shown in FIG. 9.

In this example the AP/Coordinator uses a TF (sub type ALL P2P) to allocate medium resource to more than a single P2P client (P2P 1 client and P2P 2 client). The P2P 1 client uses its allocated resource to schedule UL (to it) resources to STAs it has P2P connection with and DL (from it) to STAs it has P2P connection with. At the end of its interaction P2P 1 client also sends feedback as to the required resources for the next round to the AP. Immediately (SIFS apart) following this P2P 1 client controlled transmission, P2P 2 client transmits its own sequence of UL, DL and feedback. The UL transmission resulting from the P2P 1 client secondary TF and that resulting from P2P 2 client secondary TF may both use any combination of OFDMA allocation such that the Resource Units (RUs) for use by each of the transmitting STAs are specified in the respective TF.

Figure 10:
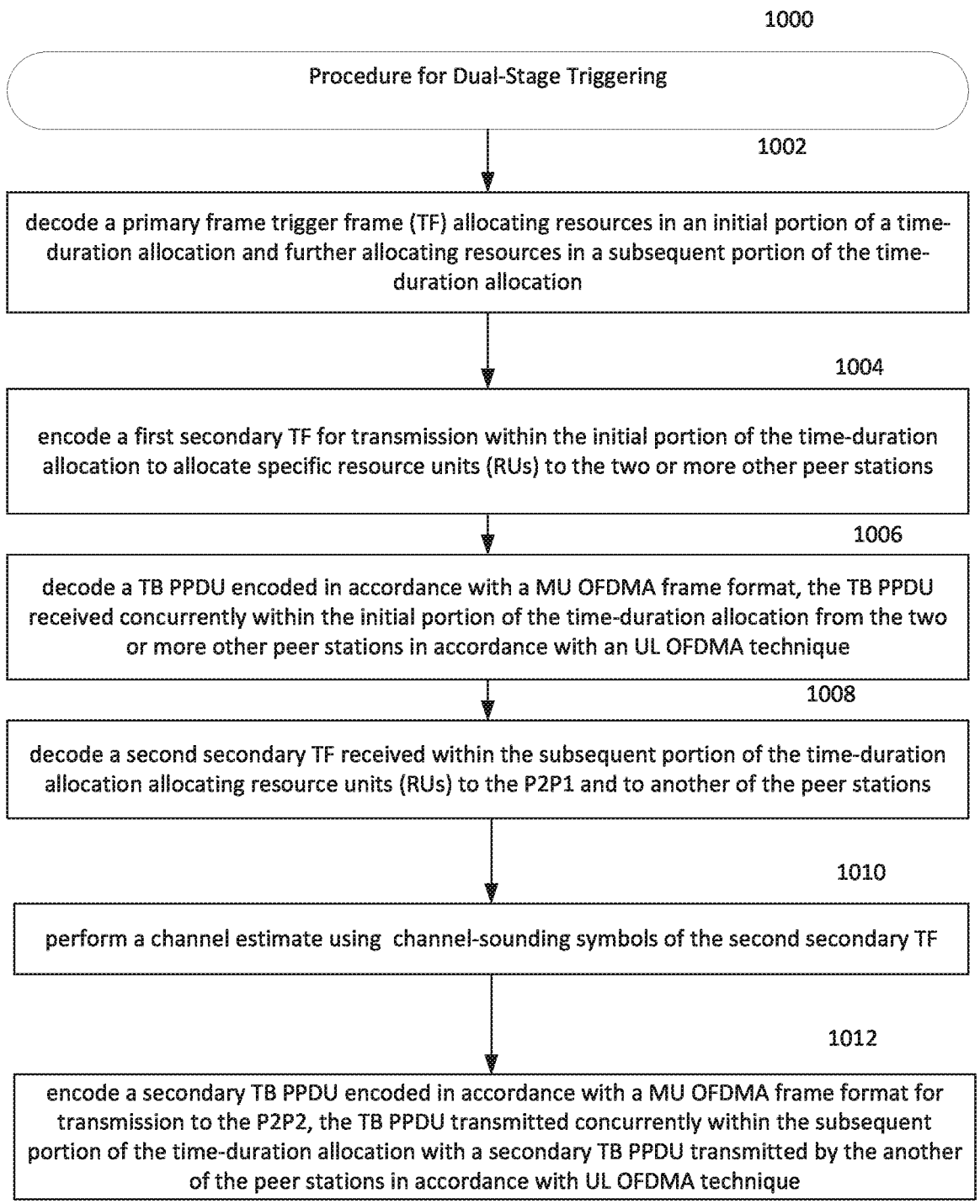
FIG. 10 is a procedure for Dual-Stage Triggering in accordance with some embodiments.

FIG. 10 is a procedure for Dual-Stage Triggering in accordance with some embodiments. Procedure 1000 may be performed by a station (STA) configured for dual-stage triggering. Operation 1002 comprises decoding a primary trigger frame (TF) allocating resources in an initial portion of a time-duration allocation and further allocating resources in a subsequent portion of the time-duration allocation.

Operation 1004 comprises encoding a first secondary TF for transmission within the initial portion of the time-duration allocation to allocate specific resource units (RUs) to the one or more other peer stations.

Operation 1006 comprises decoding a TB PPDU encoded in accordance with a MU OFDMA frame format. The TB PPDU may be received concurrently within the initial portion of the time-duration allocation from the one or more other peer stations in accordance with an uplink OFDMA technique.

Operation 1008 comprises decoding a second secondary TF received within the subsequent portion of the time-duration allocation allocating non-overlapping resource units (RUs) to the P2P1 and to another of the peer stations.

Operation 1010 comprises performing a channel estimate using the channel-sounding symbols of the second secondary TF.

Operation 1012 comprises encoding a secondary TB PPDU encoded in accordance with a MU OFDMA frame format for transmission to the P2P2. The secondary TB PPDU may be transmitted concurrently within the subsequent portion of the time-duration allocation with a secondary TB PPDU transmitted by the another of the peer stations in accordance with UL OFDMA technique.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: processing circuitry; and memory,
    wherein the processing circuitry is to configure the STA as a first peer-to-peer (P2P) client (P2P1) for P2P operations with dual-stage triggering,
    wherein for the P2P operations, the processing circuitry is configured to:
    decode a primary trigger frame (TF) received on a primary channel from an access point (AP) operating as a coordinator, the primary TF allocating resources on the primary channel in an initial portion of a time-duration allocation to the P2P1 for the P2P operations, the primary TF further allocating resources on the primary channel in a subsequent portion of the time-duration allocation to a second P2P client (P2P2) for the P2P operations;
    encode a first secondary TF for transmission on the primary channel within the initial portion of the time-duration allocation, the first secondary TF transmitted after receipt of the primary TF, the first secondary TF to allocate resource units (RUs) within the initial portion of time-duration allocation to two other peer stations, the two other peer stations comprising the P2P2 and a third P2P client (P2P3); and
    decode TB physical layer protocol data units (TB PPDUs) received on the primary channel encoded in accordance with a multi-user orthogonal frequency division multiple access (MU OFDMA) frame format, the TB PPDUs received concurrently within the initial portion of the time-duration allocation on the allocated RUs from the two other peer stations in accordance with an uplink (UL) OFDMA technique.

2. The apparatus of claim 1, wherein the first secondary TF is encoded in accordance with a legacy format with channel sounding symbols for use by the two other peer stations to perform a channel estimate to use for the transmission of the TB PPDUs in accordance with the UL OFDMA technique.

3. The apparatus of claim 2, wherein the processing circuitry is further configured to:
    decode a second secondary TF received within the subsequent portion of the time-duration allocation, the second secondary TF allocating resource units (RUs) to the P2P1 and the P2P3;
    perform a channel estimate using channel-sounding symbols of the second secondary TF; and
    encode a secondary TB PPDU encoded in accordance with a MU OFDMA frame format for transmission to the P2P2, the TB PPDU transmitted concurrently within the subsequent portion of the time-duration allocation with a secondary TB PPDU transmitted by the P2P3.

4. The apparatus of claim 3, wherein for operating in a 6 GHz band, the primary trigger frame is an enabling signal.

5. The apparatus of claim 4, wherein the TB PPDUs transmitted to the P2P1 by the AP and at least the P2P2 during the initial portion of the time duration allocation comprise an initial P2P data exchange; and
    wherein the secondary TB PPDUs transmitted to the P2P2 by the AP and at least the P2P1 during the subsequent portion of the time-duration allocation comprise a subsequent P2P data exchange.

6. The apparatus of claim 5, wherein the processing circuitry is further configured to encode a first feedback frame for transmission within the initial portion of the time-duration allocation after the initial P2P data exchange.

7. The apparatus of claim 6, wherein the processing circuitry is further configured to decode a second feedback frame transmitted by the P2P2 within the subsequent portion of the time-duration allocation after the subsequent P2P data exchange.

8. The apparatus of claim 7, wherein the first secondary TF allocates non-overlapping RUs to the two other peer stations for transmission of the TB PPDUs in accordance with the UL OFDMA technique within the initial portion of the time-duration allocation; and
    wherein the second secondary TF allocates non-overlapping RUs to the P2P1 and to the P2P3 for transmission of the secondary TB PPDUs in accordance with the UL OFDMA technique within the subsequent portion of the time-duration allocation.

9. The apparatus of claim 8, wherein the processing circuitry is configured to use the second secondary TF to synchronize timing and frequency and to determine transmit power for transmission of the secondary TB PPDU in accordance with the UL OFDMA technique.

10. The apparatus of claim 1, wherein the processing circuitry comprises a baseband processor, and
wherein the memory is configured to store the primary TF.

11. A non-transitory computer-readable storage medium that stores instructions for execution by processing circuitry of a station (STA) configurable for dual-stage triggering, wherein the processing circuitry is to configure the STA as a first peer-to-peer (P2P) client (P2P1) for P2P operations with dual-stage triggering,
wherein for the P2P operations, the processing circuitry is configured to:
decode a primary trigger frame (TF) received on a primary channel from an access point (AP) operating as a coordinator, the primary TF allocating resources on the primary channel in an initial portion of a time-duration allocation to the P2P1 for the P2P operations, the primary TF further allocating resources on the primary channel in a subsequent portion of the time-duration allocation to a second P2P client (P2P2) for the P2P operations;
encode a first secondary TF for transmission on the primary channel within the initial portion of the time-duration allocation, the first secondary TF transmitted after receipt of the primary TF, the first secondary TF to allocate resource units (RUs) within the initial portion of time-duration allocation to two other peer stations, the two other peer stations comprising the P2P2 and a third P2P client (P2P3); and
decode TB physical layer protocol data units (TB PPDUs) received on the primary channel encoded in accordance with a multi-user orthogonal frequency division multiple access (MU OFDMA) frame format, the TB PPDUs received concurrently within the initial portion of the time-duration allocation on the allocated RUs from the two other peer stations in accordance with an uplink (UL) OFDMA technique.

12. The non-transitory computer-readable storage medium of claim 11, wherein the first secondary TF is configured for use by the two other peer stations to perform a channel estimate for the transmission of the TB PPDUs in accordance with the UL OFDMA technique.

13. The non-transitory computer-readable storage medium of claim 12, wherein the processing circuitry is further configured to:
decode a second secondary TF received within the subsequent portion of the time-duration allocation, the second secondary TF allocating resource units (RUs) to the P2P1 and the P2P3, the second secondary TF including channel-sounding symbols;
perform a channel estimate using the channel-sounding symbols of the second secondary TF; and
encode a secondary TB PPDU encoded in accordance with a MU OFDMA frame format for transmission to the P2P2, the TB PPDU transmitted concurrently within the subsequent portion of the time-duration allocation with a secondary TB PPDU transmitted by the P2P3 in accordance with UL OFDMA technique.

14. The non-transitory computer-readable storage medium of claim 13, wherein for operating in a 6 GHz band, the primary trigger frame is an enabling signal.

15. The non-transitory computer-readable storage medium of claim 14, wherein the TB PPDUs transmitted to the P2P1 by the AP and at least the P2P2 during the initial portion of the time duration allocation comprise an initial P2P data exchange; and
wherein the secondary TB PPDUs transmitted to the P2P2 by the AP and at least the P2P1 during the subsequent portion of the time-duration allocation comprise a subsequent P2P data exchange.

16. The non-transitory computer-readable storage medium of claim 15, wherein the processing circuitry is further configured to encode a first feedback frame for transmission within the initial portion of the time-duration allocation after the initial P2P data exchange.

17. The non-transitory computer-readable storage medium of claim 16, wherein the processing circuitry is further configured to decode a second feedback frame transmitted by the P2P2 within the subsequent portion of the time-duration allocation after the subsequent P2P data exchange.

18. The non-transitory computer-readable storage medium of claim 17, wherein the first secondary TF allocates non-overlapping RUs to the two other peer stations for transmission of the TB PPDUs in accordance with the UL OFDMA technique within the initial portion of the time-duration allocation; and
wherein the second secondary TF allocates non-overlapping RUs to the P2P1 and to the P2P3 for transmission of the secondary TB PPDUs in accordance with the UL OFDMA technique within the subsequent portion of the time-duration allocation.

19. An apparatus of an access point (AP), the apparatus comprising: processing circuitry; and memory,
wherein for peer-to-peer (P2P) operations with dual-stage triggering operating as a coordinator, the processing circuitry is configured to:
encode a primary trigger frame (TF) for transmission on a primary channel, the primary TF allocating resources on the primary channel in an initial portion of a time-duration allocation to a first peer client (P2P1) for the P2P operations, the primary TF further allocating resources on the primary channel in a subsequent portion of the time-duration allocation to a second P2P client (P2P2) for the P2P operations;
decode a first secondary TF transmitted by the P2P1 on the primary channel within the initial portion of the time-duration allocation, the first secondary TF received by the AP after transmission of the primary TF, the first secondary TF to allocate resource units (RUs) within the initial portion of time-duration allocation to two other peer stations, the two other peer stations comprising the P2P2 and a third P2P client (P2P3);
determine a channel estimate using the first secondary TF; and
encode a TB PPDU encoded received on the primary channel in accordance with a MU OFDMA frame format for transmission to the P2P2 on the allocated RUs, wherein a second TB PPDU is transmitted concurrently within the initial portion of the time-duration allocation from the P2P3 on the allocated RUs, and wherein the TB PPDU transmitted by the AP is transmitted in accordance with an uplink OFDMA technique using the channel estimate.

20. The apparatus of claim 19, wherein the processing circuitry is further configured to:
- decode a second secondary TF received within the subsequent portion of the time-duration allocation, the second secondary TF allocating resource units (RUs) to the P2P1 and to the AP;
- perform a second channel estimate using channel-sounding symbols of the second secondary TF; and
- encode a secondary TB PPDU encoded in accordance with a MU OFDMA frame format for transmission to the P2P2, the TB PPDU transmitted concurrently within the subsequent portion of the time-duration allocation with a secondary TB PPDU transmitted by the P2P1 in accordance with UL OFDMA technique.

\* \* \* \* \*